US009135777B2

(12) United States Patent
Hamlin et al.

(10) Patent No.: US 9,135,777 B2

(45) Date of Patent: Sep. 15, 2015

(54) MANAGEMENT OF DOWNLOADABLE GAME COMPONENTS IN A GAMING SYSTEM

(75) Inventors: Vernon Hamlin, Lisle, IL (US); Craig J. Sylla, Round Lake, IL (US); Mark B. Gagner, West Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 665 days.

(21) Appl. No.: 11/995,907

(22) PCT Filed: Jul. 20, 2006

(86) PCT No.: PCT/US2006/028168

§ 371 (c)(1), (2), (4) Date: Jan. 16, 2008

(87) PCT Pub. No.: WO2007/013970

PCT Pub. Date: Feb. 1, 2007

(65) Prior Publication Data

US 2009/0247301 A1 Oct. 1, 2009

Related U.S. Application Data

(60) Provisional application No. 60/700,942, filed on Jul. 20, 2005.

(51) Int. Cl.

*A63F 13/323* (2014.01)
*G07F 17/32* (2006.01)

(52) U.S. Cl.

CPC .............. *G07F 17/323* (2013.01); *G07F 17/32* (2013.01)

(58) Field of Classification Search

CPC ... G07F 17/323; G07F 17/32; G07F 17/3225; G07F 17/3227
USPC ................. 463/18, 40–42, 1–6; 717/168–173
See application file for complete search history.

(56) References Cited

U.S. PATENT DOCUMENTS

| | | | | | |
|---|---|---|---|---|---|
| 5,740,368 | A * | 4/1998 | Villalpando | ................. | 709/202 |
| 5,987,513 | A * | 11/1999 | Prithviraj et al. | ............. | 709/223 |
| 2002/0137217 | A1 * | 9/2002 | Rowe | ............................. | 436/42 |
| 2005/0192099 | A1 * | 9/2005 | Nguyen et al. | .................. | 463/42 |

OTHER PUBLICATIONS

"International Search Report for Application No. PCT/US2006/28168, date mailed Dec. 14, 2006", 4 pgs.
"Written Opinion of the International Searching Authority for Application No. PCT/US2006/28168, date mailed Dec. 14, 2006", 7 pgs.

* cited by examiner

*Primary Examiner* — Ronald Leneau
*Assistant Examiner* — Ross Williams
(74) *Attorney, Agent, or Firm* — Nixon Peabody LLP

(57) ABSTRACT

Systems and methods provide interfaces to control the download of downloadable game components to one or more gaming machines or systems. The gaming configuration elements may include banner content, advertising content, denomination data, pay table, language data, video content, audio content, episodic game data, wagering game software, operating system software, device driver software and device firmware.

22 Claims, 9 Drawing Sheets

MANAGEMENT OF DOWNLOADABLE GAME COMPONENTS IN A GAMING SYSTEM

RELATED APPLICATIONS

This application is a U.S. National Stage Filing under 35 U.S.C. 371 from International Patent Application Serial No. PCT/US2006/028168, filed Jul. 20, 2006, and published on Feb. 1, 2007 as WO 2007/013970 A1, which claims the priority benefit of U.S. Provisional Application Ser. No. 60/700,942 filed Jul. 20, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

BACKGROUND

Gaming machines may be operated as a stand alone unit, or linked in a network of some type to a group of gaming machines. As technology in the gaming industry progresses, more and more gaming services are being provided to gaming machines via communication networks that link groups of gaming machines to a remote central server computer that provides one or more gaming services. As an example, gaming services that may be provided by the remote computer to a gaming machine via a communication network of some type include player tracking, accounting, cashless award ticketing, lottery, progressive games and bonus games. In addition, gaming machines are evolving into gaming platforms where the gaming services and game play options provided on the gaming machines may be dynamically configured. Thus, the number and type of game services and game play options offered on a particular gaming machine may vary with time.

A gaming entity may operate hundreds, thousands or ten of thousands of gaming machines. Since gaining is allowed in many locations throughout the world, casinos may have games distributed over a wide geographic area. Within casinos, the gaming machines may be connected via one or more dedicated networks. Servers are usually located in a backroom of the casino away from the casino floor.

Current techniques for initially loading, modifying or replacing game software in gaming machines are generally inconvenient, time-consuming, and expensive. In one technique, the entire gaming machine is disconnected from the central server and replaced with a new machine. This involves the shipment of machines to and from a gaming establishment and requires the services of an appreciable number of skilled and semi-skilled service personnel. The service personnel must identify the machines to be replaced, locate the machines on the gaming establishment floor, and then replace the existing machines with the new machines. In another technique, the media containing the software is replaced with new media containing the new software. Again, the service personnel must identify the machines to receive the new software media, locate the machines on the gaming establishment floor, and then replace the existing media with the new media. In this case, media may be a hard disk, flash, various non-volatile media such as EEPROM, EPROM, etc.

In yet another technique, the new software can be downloaded to the gaming machine from the central server linked to the gaming machine. This downloading technique facilitates modifications to the game software in that it does not require removal of the gaming machine and does not require service personnel to visit the gaming machine site or the gaming machine itself. However, managing gaming machines that can receive downloaded software and data can be a problem. Determining which software and data belongs on which gaming machine can be a daunting task, especially in a gaming establishment with numerous gaming machines, or in environments where numerous gaming machines exist across multiple gaming establishments. The complexity of the problem and the number of potential configurations increases rapidly with the number of gaming machines that can receive downloadable software and data.

SUMMARY

The above-mentioned shortcomings, disadvantages and problems are addressed by the present invention, which will be understood by reading and studying the following specification.

Systems and methods provide interfaces to control the download of downloadable game components to one or more gaming machines or systems. The gaming configuration elements may include banner content, advertising content, denomination data, pay table, language data, video content, audio content, episodic game data, wagering game software, operating system software, device driver software and device firmware.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

Figure 1:
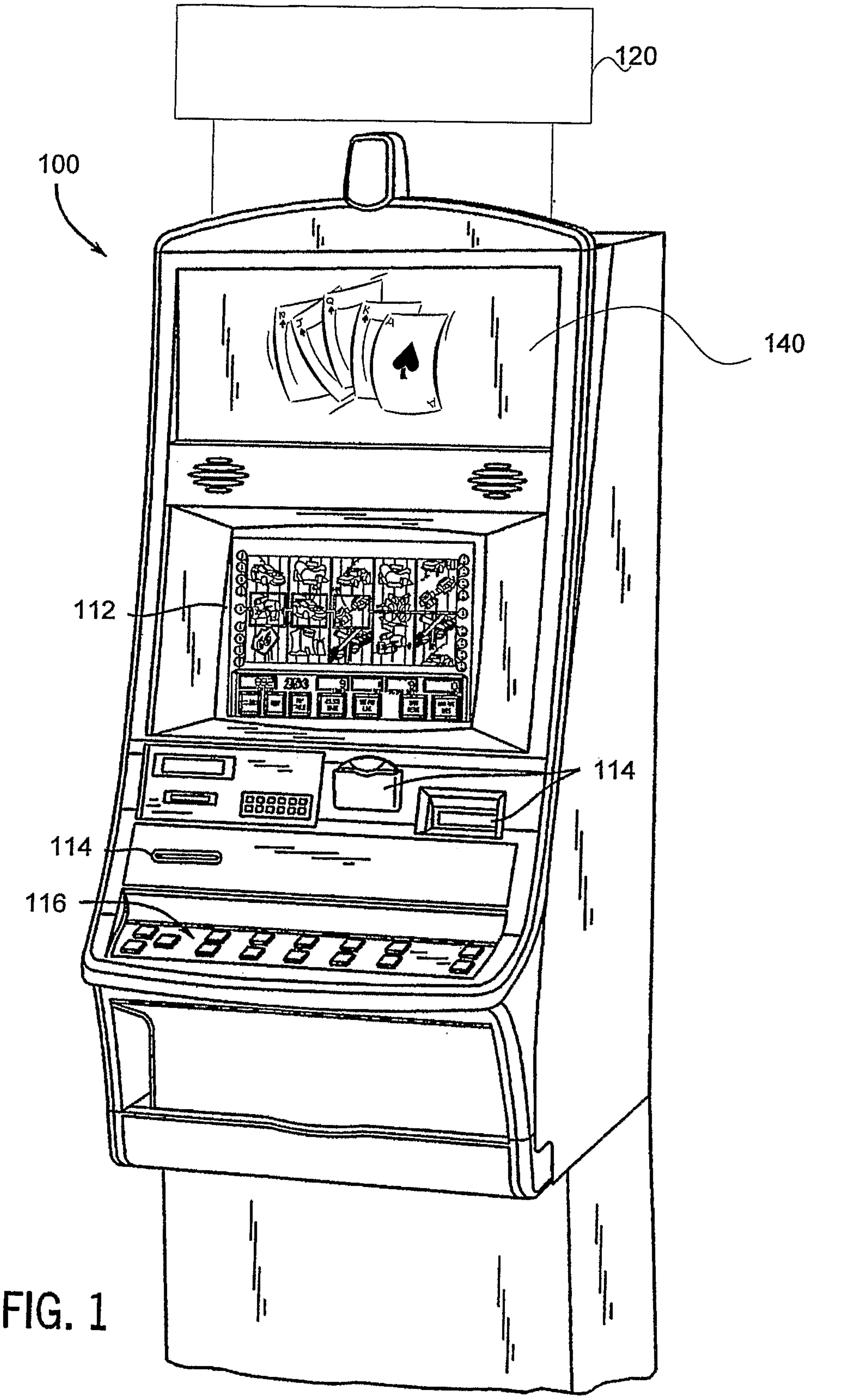
FIG. 1 is a perspective view of a gaming machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 illustrates an example gaming machine 100 in which may be included various embodiments of the invention. In some embodiments, gaming machine 100 is operable to conduct a wagering game. These wagering games may include reel based wagering games such as mechanical or video slots, card based games such as video poker, or other types of wagering games such as video keno, video bingo or a video dice game. If based in video, the gaming machine 100 includes a video display 112 such as a cathode ray tube (CRT), liquid crystal display (LCD), plasma, or other type of video display known in the art. In the illustrated embodiment, the gaming machine 100 is an "upright" version in which the display 112 is oriented vertically relative to a player. Alternatively, the gaming machine may be a "slant-top" version in which the display 112 is slanted at about a thirty-degree angle toward the player. Further, the gaming machine may be a "bar-top" version in which the display is mounted horizontally in a bar top or table top. Still further, the gaming machine may be housed in a wall mounted or other vertically mounted cabinet.

The gaming machine 100 includes a plurality of possible credit receiving mechanisms 114 for receiving credits to be used for placing wagers in the game. The credit receiving mechanisms 114 may, for example, include a coin acceptor, a bill acceptor, a ticket reader, and a card reader. The bill acceptor and the ticket reader may be combined into a single unit. The card reader may, for example, accept magnetic cards and smart (chip) cards coded with money or designating an account containing money.

In some embodiments, the gaming machine 100 includes a user interface comprising a plurality of push-buttons 116, and other possible devices. The plurality of push-buttons 116 may, for example, include one or more "bet" buttons for wagering, a "play" button for commencing play, a "collect" button for cashing out, a help" button for viewing a help screen, a "pay table" button for viewing the pay table(s), and a "call attendant" button for calling an attendant. Additional game specific buttons may be provided to facilitate play of the specific game executed on the machine. A touch screen overlaying video display 112 may define touch keys for implementing many of the same functions as the push-buttons. Additionally, in the case of video poker, the touch screen may implement a card identification function to indicate which cards a player desires to keep for the next round. Other possible user interface devices include a keyboard and a pointing device such as a mouse or trackball.

In some embodiments, gaming machine 100 includes a top box 140. Top box 140 may contain a video display, a mechanical display, or a diorama display that supplements display 112. For example, the display in top box 140 may be a wheel such as a rotating wheel, mechanical dice, a board for a board game, or other such display.

A processor controls operation of the gaming machine 100. In response to receiving a wager and a command to initiate play, the processor randomly selects a game outcome from a plurality of possible outcomes and causes the display 112 to depict indicia representative of the selected game outcome. In the case of slots for example mechanical or simulated slot reels are rotated and stopped to place symbols on the reels in visual association with one or more pay lines. If the selected outcome is one of the winning outcomes defined by a pay table, the CPU awards the player with a number of credits associated with the winning outcome.

In some embodiments, gaming machine 100 may include signage 120. Signage 120 may be a display device capable of displaying advertising, gaming information (e.g. type of game, denomination of game etc.) or other information to a player or potential player.

It should be noted that in some embodiments, the gaming machine may be a portable or handheld gaming machine. In these embodiments, the portable gaming machine include some or all of user interface elements as described above, however the user interface elements may be scaled or formatted to fit within the housing of the portable gaming machine.

Figure 2:
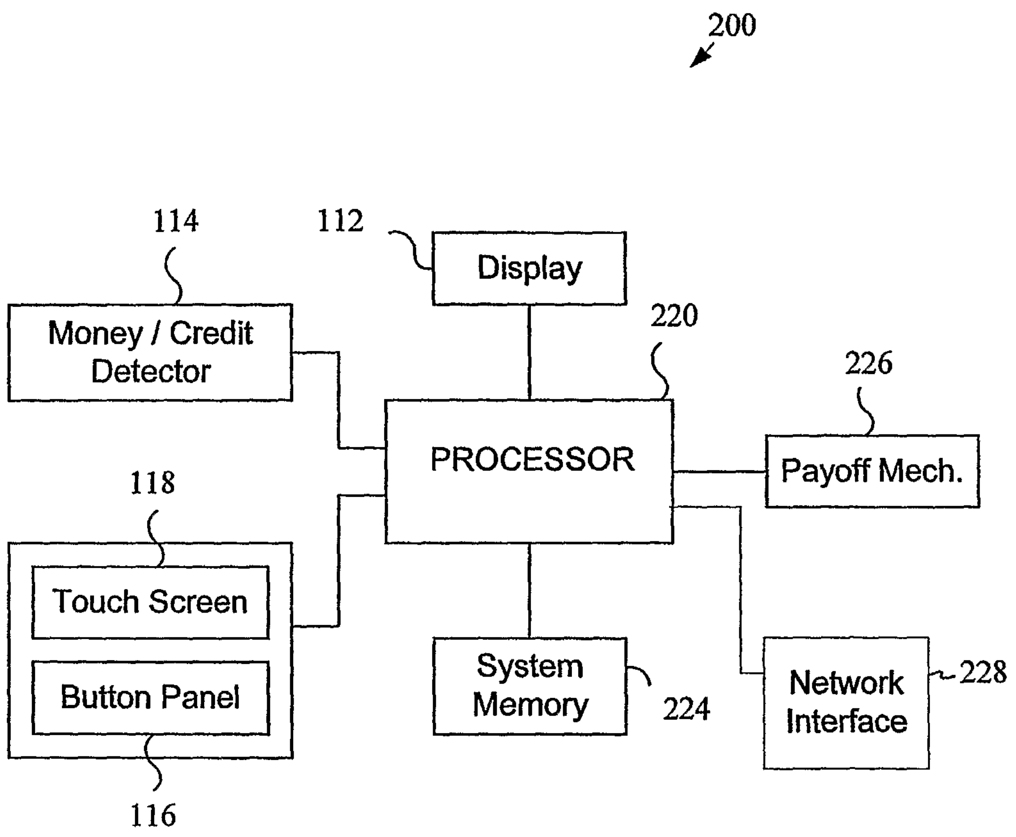
FIG. 2 is a block diagram of processing components of a gaming machine according to an example embodiment.

FIG. 2 is a block diagram of a control system 200 suitable for operating the gaming machine 100. Money/credit detector 222 signals a processor 220 when a player has inserted money, tickets, tokens, cards or other mechanism for obtaining credits for plays on the gaming machine through credit mechanisms 114. Using a button panel 116 and/or a touch screen 218, the player may select any variables associated with the wagering game and place his/her wager to purchase a play of the game. In a play of the game, the processor 220 generates at least one random event using a random number generator (RNG) and provides an award to the player for a winning outcome of the random event. Alternatively, the random event may be generated by a remote computer using an RNG or pooling schema and then transmitted to the gaming machine. The processor 220 operates the display 112 to represent the random event(s) and outcome(s) in a visual form that can be understood by the player. In addition to the processor 20, the control system may include one or more additional slave control units for operating the display 112 and any secondary displays.

System memory 224 stores control software, operational instructions and data associated with the gaming machine. In some embodiments, the system memory 224 comprises a separate read-only memory (ROM) and battery-backed random-access memory (RAM). However, it will be appreciated that the system memory 224 may be implemented on any of several alternative types of memory structures or may be implemented on a single memory structure. For example, memory 224 may comprise multiple banks of memory, including RAM, compact flash, hard drives, CD-ROM drives, DVD-ROM drives and combinations thereof.

A payoff mechanism 226 is operable in response to instructions from the processor 220 to award a payoff to the player. The payoff may, for example, be in the form of a number of credits. The number of credits is determined by one or more math tables stored in the system memory 224. As noted above with respect to FIG. 1, the payoff mechanism may be a coin hopper, a ticket printer, a magnetic card writer, or a database update mechanism that updates a database maintaining account information.

Network interface 228 operates to communicably couple system 200 in gaming machine 100 to a network. The network may be any type of wired or wireless network and the network interface 228 may vary based on the type of network. In some embodiments, the network comprises a gaming establishment network such as a LAN (local area network). In alternative embodiments, the network may be an intranet linking multiple networks, for example, the networks of a gaming enterprise that operates multiple gaming establishments. In further alternative embodiments, the network may comprise the Internet.

Figure 3:
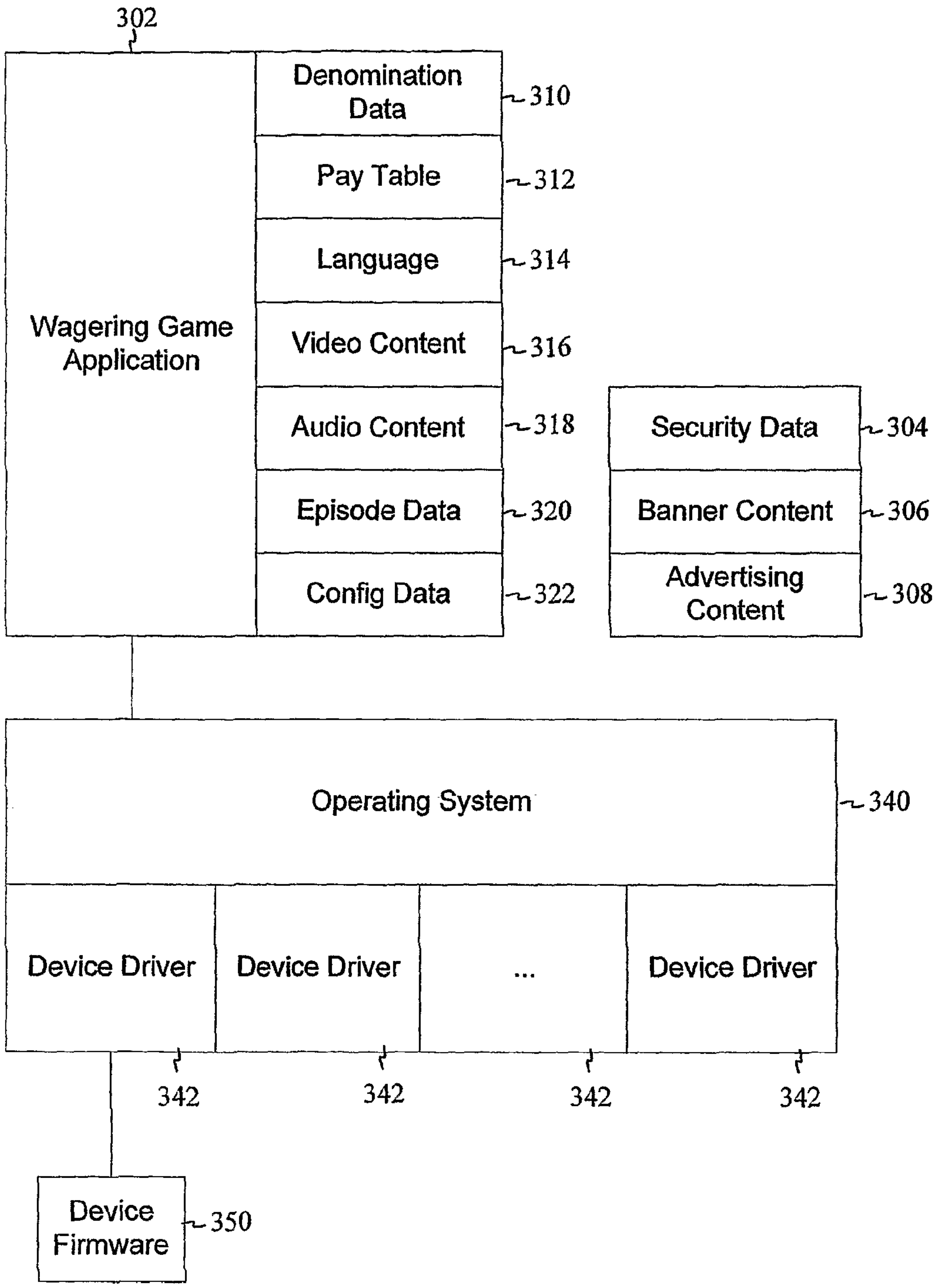
FIG. 3 is a block diagram of major software components of a gaming machine according to an example embodiment.

FIG. 3 illustrates various software executable and data components that may operate on a gaming machine 100. These components may comprise configuration elements for the gaming machine. In some embodiments, these components include wagering game application 302, game content and data 304-320, operating system 340, device driver 342 and device firmware 350.

Operating system 340 controls the execution of tasks, processes and applications (e.g. wagering game application 302) running on a gaming machine, and provides interfaces between applications and the hardware present on a gaming machine. The operating system may be proprietary to the gaming machine manufacturer or owner, or the operating system may be provided by a third party. Examples of operating systems that may run within the gaming machine environment include the Microsoft Windows family of operating systems, variants of the UNIX operating system, Linux, and real-time operating systems such as VRTX and QNX. The embodiments are not limited to any particular operating system.

Device driver 342 provides a software interface to hardware that may be present on a gaming machine and software that desires to utilize such hardware, such as a wagering game application 302. Typically a device driver is a software component that is added to the operating system software, and must be designed to provide interfaces expected by the operating system. A different device driver 342 typically exists for each type of hardware present on a gaming machine. For example, a ticket printer may have a device driver, a credit acceptor may have a different device driver etc.

Device firmware 350 comprises software that may be downloaded onto a persistent memory resident on a device that may be a component of gaming machine 100. For example, a ticket printer may include an embedded processor that executes software or reads data from firmware on a flash memory resident on the ticket printer. Other devices that are part of gaming machine 100 may also have firmware to control the operation and interface to the device.

Wagering game application 302 comprises software that controls the execution of a wagering game on gaming machine 100. For example, the wagering game application may provide a slot machine application (video or mechanical), keno, card based wagering games (e.g. poker), dice based wagering games or other types of wagering games. The embodiments are not limited to a particular wagering game application.

Wagering game 302 may include one or more data or executable components. These components include denomination data 310, pay table 312, language data 314, video content 316, audio content 318, episode data 320, and configuration data 322. Denomination data 310 includes data that determines the denomination or denominations that the gaming machine uses to determine the amount of a wager. For example, a gaming machine may accept payment for credits in units of $0.25, $0.50, $1.00, $5.00 or other amounts. In addition, denomination data 310 also determines the currency for the wagered amount. For example, the currency may be United States dollars, French francs, Euros or other currency.

Pay table 312 may be used to determine which outcomes are winning outcomes and the amount to be credited or paid out for the various winning outcomes. Pay table 312 may be a single table in some embodiments. In alternative embodiments, multiple pay tables may be present on a gaming machine and vary depending on which game or game version is currently in use.

Language data 314 comprises one or more data sets or files that contain text to be displayed on the gaming machine. The use of language data 314 allows a wagering game application to display text in the language common the location where the gaming machine is used without requiring customization of the wagering game application.

Video content 316 comprises video data that may be displayed by wagering game application during the course of wagering game play or in an attract mode of the gaming machine. For example, video content may comprise video clips that are displayed to the user during game play, during a bonus round, or while the gaming machine is in attract mode.

Audio content 318 comprises audio data that may be played by the wagering game application during the course of wagering game play, bonus round play, or in an attract mode of the gaming machine. In some embodiments, the audio content may be part of an audio program played on multiple gaming machines to produce a surround-sound effect.

In some embodiments, a portion of video content 316 or audio content 318 may be provided by a gaming establishment and played during game play or in attract mode. This allows the gaming establishment to tailor a gaming machine for their environment. For example, the gaming establishment may desire to provide video or audio content having a theme that is consistent with a theme within the gaming establishment as a whole.

Episode data 320 provides configuration data regarding episodes for a game. In some embodiments, the wagering game may be presented to the user in episodes. For example, bonus rounds may vary depending on the episode, or symbols and characters displayed during game play or game play rules may vary with each episode. Additionally, in some embodiments, some or all of video content 316 and audio content 318 may vary depending on the current episode. Episode data 320 may be used to determine which episode is currently presented to the user.

Configuration data 322 represents other types of configuration data related to the operation of a gaming machine or a group of gaming machines. Examples of such data include the uses for buttons present on the gaming machine.

In addition to wagering game application related configuration elements, a gaming machine may have other types of configuration components. In some embodiments, these components include security data 304, banner content 306 and advertising content 308. Security data 304 may be any type of security data related to the operation of a gaming machine or group of gaming machines. In some embodiments, the security data comprises user identification and/or password data. In alternative embodiments, the security data may comprise public key/private key encryption data. In further alternative embodiments, the security data may comprise key ring data for a group of keys. In still further embodiments, the security data may comprise biometric data. Additionally, the security data may comprise authentication and/or authorization data.

Banner content 306 comprises content intended to be displayed on a secondary display or overhead sign for a gaming machine. The banner content may be displayed on a single gaming machine, or it may be content designed to be displayed as part of the content for multiple gaming machines. For example, the content may be displayed in a manner such that the content appears to travel from one machine to the next. Alternatively, the content may be one portion of a message that is displayed across multiple gaming machines.

Advertising content 308 comprises advertising video, audio, or text data that may be played or displayed on a gaming machine.

Various combinations of the above-described configuration elements may be downloaded onto a gaming machine. It should be noted that no embodiment requires that all the above-described configuration elements be downloadable, rather varying embodiments will provide for the download of varying combinations of one or more of the above-described configuration elements.

Further, the above described configuration elements may be downloaded at different times. For example, it may be desirable to download wagering game applications components, operating system components, device driver components and the like when the machine is idle (i.e. not in use). However, other configuration elements such as episode data, banner content and advertising content may be downloaded at any time, including during wagering game play.

Additionally, some or all of the above-described configuration elements may have different versions. For example, the operating system 340, device driver 342, device firmware 350, or wagering game application 302 may exist in differing versions, with each version having differing combinations of features and/or updates to fix problems with previous versions. Typically a version will have a version identifier associated with it to indicate the software version for the configuration element.

Figure 4:
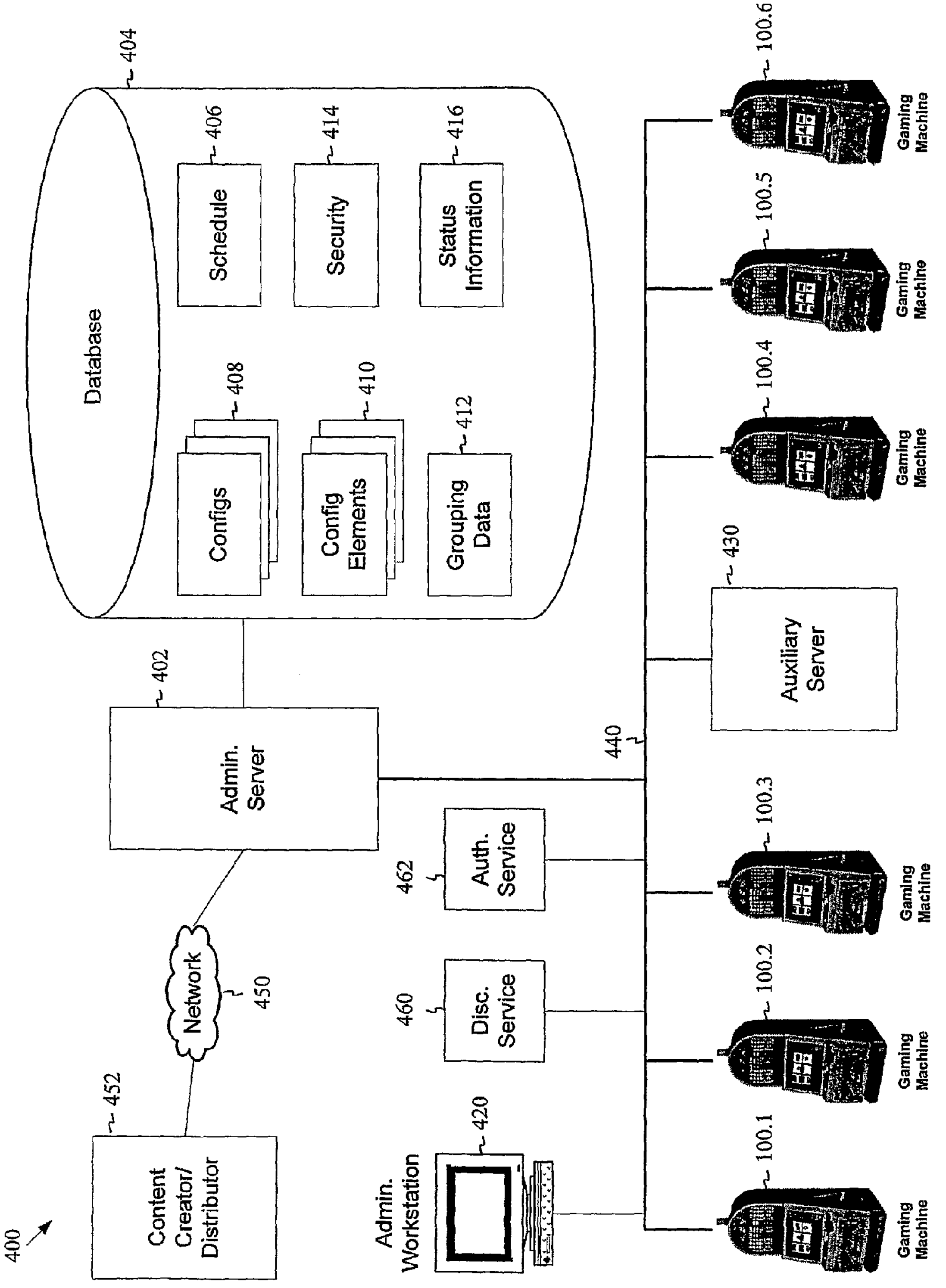
FIG. 4 is a block diagram of a network of gaming machines administration computers, and services according to an example embodiment.

FIG. 4 illustrates various components of a gaming machine network 400 in which embodiments of the invention may be incorporated. In some embodiments, the gaming machine network includes administrative server 402, administrative workstation 420 and gaming machines 100, all communicably coupled via network 440. Network 440 may be a wired or wireless network, or a combination of wired and wireless networks. In some embodiments, network 440 is a gaming establishment local area network. In alternative embodiments, network 440 may be a network that links multiple gaming establishments or facilities. In further alternative embodiments, network 440 may include the Internet.

In some embodiments, administrative server 402 provides downloadable content to gaining machines 100. The downloadable content may comprise any combination of the configuration elements described above with reference to FIG. 3. In some embodiments, content may be pushed from administrative server 402 to a gaming machine. In alternative embodiments, gaming machines 100 may pull content from administrative server 402.

In some embodiments, administrative server 402 maintains a database 404 of configurations and configuration elements available for download to gaming machines 100. Although shown as one entity for convenience, database 404 may be comprised of multiple databases. Further, database 404 may be a relational database, hierarchical database, object oriented database, XML database or a set of one or more files in a file system and combinations of the above. In some embodiments, database 404 may include one or more configurations 408, configuration components 410, schedule 406, grouping data 412, security data 414 and status information 416.

A configuration 408 comprises data identifying the configuration components 410 that are to be loaded onto a gaming machine, and may also include other parameters regarding the operation of a gaming machine. The configuration components 410 may be data representing or identifying the configuration elements discussed above with respect to FIG. 3 or the configuration component may be the actual configuration element self. A particular configuration may be shared by multiple gaining machines, that is, multiple gaming machines may be identically configured so that they operate in an identical manner.

Schedule 406 comprises data regarding when a configuration 408 or configuration element represented by a configuration component 410 is to be downloaded to a gaming machine in order to update the gaming machine with one or more new configuration elements. The schedule 406 may specify a one time update at a particular time, or it may specify updates that are repeated at particular times of the day, days of the week, or days of the year. For example, denomination data may be updated at the same time of day each day of the week when demand for particular wagering games or gaming machines is higher or lower. Thus a game that is $0.25 per credit during the early morning and daytime hours may be adjusted to a $1.00 per credit game during evening hours when demand may be higher.

Schedule 406 may also specify the earliest or latest time a gaming machine is to be updated after the machine has become idle (i.e. not in use).

Grouping data 412 includes data that indicates how multiple gaming machines may be associated with one another. The grouping data may specify machines that are part of a progressive wagering game. Additionally, the grouping data 412 may specify gaming machines that are in proximity with one another and that are used to provide a surround sound effect, or to display banner content that appears to shift from gaming machine to gaming machine. Further, the grouping data may specify gaming machines that are part of a "high rollers" set of gaming machines intended for use by customers that engage in frequent wagering activity or tend to wager larger amounts.

Security data 414 represents authorization and authentication data used to verify who may access a gaming machine and for what purposes. For example, technicians desiring to access a gaming machine in order to diagnose or repair problems may be required to enter user identification and passwords. In addition, as mentioned above a public/private key combination may be used in which case security data 414 may include key or keyring information.

Status information 416 may include information regarding the current state of a gaming machine. One example of such information includes the current versions of software loaded onto the machine. Such version information may be used to determine if an update is required. Additional status information may include the hardware present on the machine. This information may be useful to determine if software to be downloaded to a gaming machine is compatible with the hardware present on the gaming machine. Further status information may include whether the gaming machine is currently in use, whether there has been a tilt condition detected on the gaming machine and other runtime information regarding the gaming machines current status.

Administrative workstation 420 in some embodiments provides a user interface to gaming establishment personnel that may be used to configure, control and update gaming machines on a gaming machine network 440. Traditionally, to change gaming content, denominations, paytable (lines, percentages) or languages a technician would have to go to a casino, find the gaming machine on the floor and perform a RAM Clear and reconfigure in the case of denominations and paytable. For languages, a casino technician would have to find the gaming machine on the casino floor and physically enter the Operator Menu and change the languages.

In one embodiment, the administrative workstation provides an interface that allows the casino technician to perform various desired functions, such as changing language configuration, changing paytables lines, percentages) and denominations, changing theme, and updating casino specific content. In some embodiments, the interface may comprise a “wizard” interface that assists the technician in configuring one or more gaming machines by prompting the technician for relevant parameters. In alternative embodiments a “drag and drop” interface may be provided on the administrative workstation 420.

In addition to manually changing these attributes, the casino operator may also use the administrative workstation 420 to edit schedule changes for gaming machine configuration elements by day, time of day and/or month, allowing casino operators to maximize payout for peak casino playing times and to personalize content for a gaming establishment. The schedule may also provide for theme changes during holiday periods or seasons of the year.

Language configurations may also be changed using the administrative workstation 420. When casino operators want to change languages, the administrative workstation may be used to select one or more of the available languages and use the interface to enable or download the languages listed. The gaming machine then updates the languages available to the player from a selected device on the gaming network.

Denominations and pay tables (lines/percentages) may also be configured and/or updated using the administrative workstation 420. In some embodiments, the pay table and denominations that a gaming machine can support may be stored in status information in the database. A casino operator may use the administrative workstation 420 to change desired denominations and/or pay table. The gaming machine is then updated with new denomination and/or pay table data. The gaming machine then changes to the appropriate denomination and/or pay table.

In some embodiments, system 400 includes an auxiliary server 430. Auxiliary server 430 may be any type of server coupled to network 440 that provides gaming related services. For example, auxiliary server 430 may be a progressive server that manages a progressive wagering game in which multiple gaming machines contribute to a pool of potential winnings that may be paid out to any gaming machine participating in the progressive wagering game upon certain outcomes. Alternatively, auxiliary server 430 may be an overhead sign controller that controls the display of overhead signs in a gaming establishment. Other types of auxiliary servers are within the scope of the inventive subject matter. In some embodiments, administrative workstation 420 may be used to configure and control these auxiliary servers in the same manner as described above for gaming machines.

Some embodiments include a discovery service 460. Discovery service 460 provides a central point of contact that other systems on network 440 may used in order to discover where network resources are located. For example, a gaming machine 100 may query discovery service 460 to determine where it may obtain downloadable software components.

Additionally, some embodiments include an authentication service 462. Authentication service 462 implements an authentication protocol that provides a mechanism to determine that a system on network 440 is who it says it is in order to prevent an unauthorized system from gaining access to downloadable software components that may be available on network 440.

It should be noted that either or both discovery service 460 and authentication service 462 may be provided on separate servers on network 440, or they may be services provided by administration server 402.

Content creator/distributor system 452 comprises a system that may provide downloadable software content to a gaming machine operator through network 450. For example, system 452 may be maintained by a gaming machine manufacturer in order to provide software content to gaming machines and/or systems that have been purchased by a gaming establishment operating network 440. Network 450 may be any type of wired or wireless network communicably coupling system 452 to a system on network 440. In some embodiments, network 450 may be a private network. In alternative embodiments, network 450 may be a public network such as the Internet.

Figure 5A:
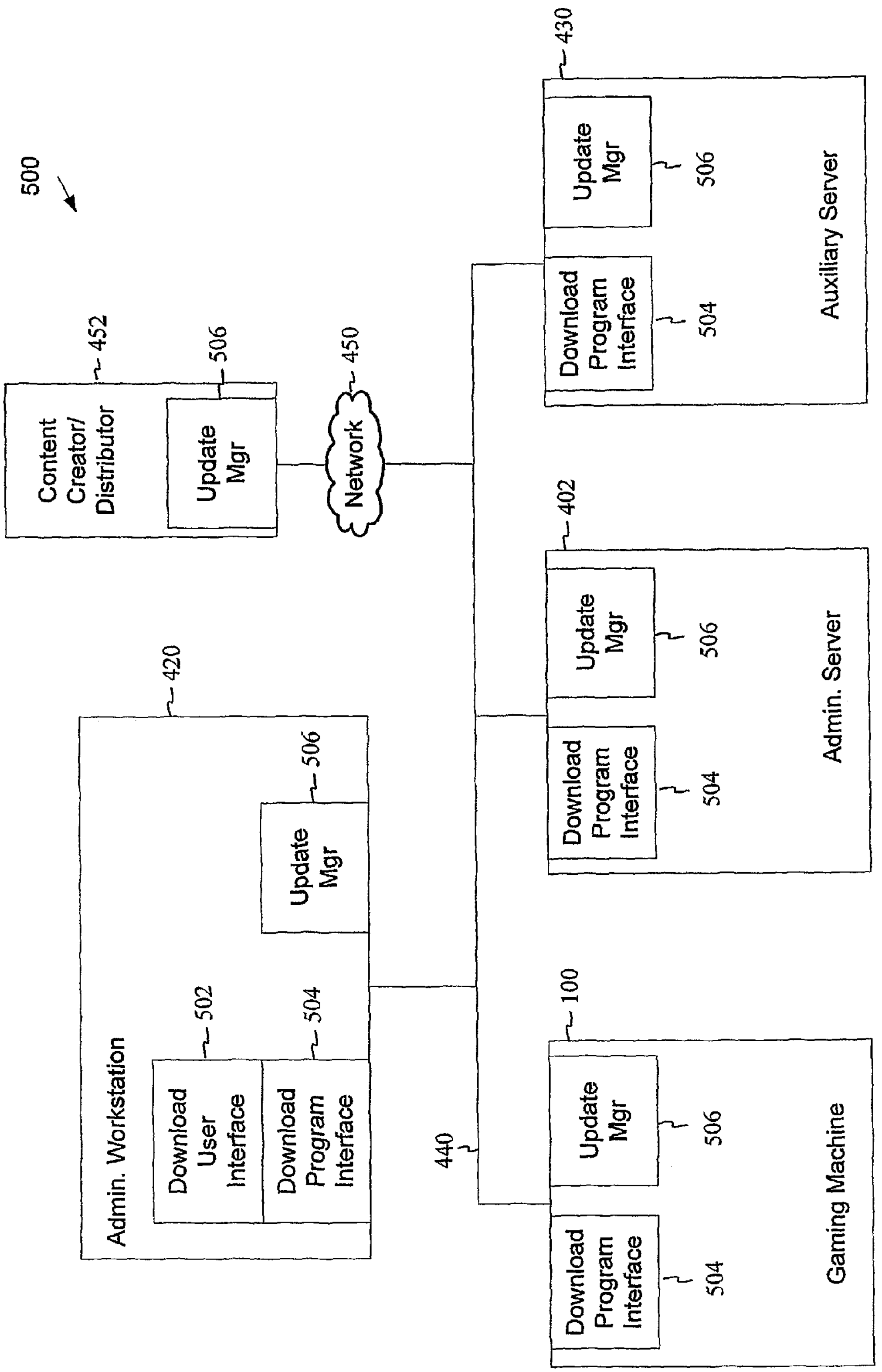
FIGS. 5A-5C are block diagrams of components used to manage downloads in a gaming network according to example embodiments.

FIG. 5A is a block diagrams providing further details of components used to manage downloads in a gaming network according to example embodiments. In some embodiments, various systems accessible on a network 440 include a download program interface 504, which may be accessed by a download user interface 502 running on an administrative workstation 420.

Download program interface 504 may provide an API (Application Program Interface) that allows an application or operating system to specify and control how downloadable software components are to be handled. For example, download program interface may supply functions, methods and data that may be used to initiate a download, specify how and where a downloadable component is to be obtained, and how to transfer the downloadable component to or from a system. Further, the download program interface may supply methods, functions and/or data that may be used to supply authentication data such as passwords or keys necessary to initiate a download.

In some embodiments, an update manager 506 operates on systems in a gaming network 440 in order to control how and when downloadable content may be sent and received. For instance, in some embodiments, an update manager 506 may query or poll another system in order to determine whether new or updated software components are available for download. As an example, an update manager 506 on a gaming machine 100 may query or poll an administrative server 402 or an administration workstation 420 in order to determine if new or updated components are available for download. Similarly, an update manager on administrative workstation 420 may query or poll an update manager 506 running on a content creator or distributor system 452 in order to determine if new or updated components are available.

In alternative embodiments, an update manager 406 on one system may push downloadable content to another system. For example, an update manager 506 on administrative workstation 420 may notify an update manager 506 on a gaming machine 100 that new or updated software components are available for download, and initiate or schedule the download.

In further alternative embodiments, update managers 506 may implement hybrid push/pull mechanism. As an example, an update manager 506 on creator/distributor system 452 may notify an update manager 506 on administrative workstation 420 that new or updated software components are available for download. The update manager 506 on administrative workstation 420 may then cause a user interface element such as an icon, button, message window, dialogue box etc. to be activated notifying a user on the workstation that an update is available. The user may then use the download user interface 502 to pull the content from system 452.

Update manager 506 may use functions provided by download program interface 504 to control downloading software components.

Figure 5B:
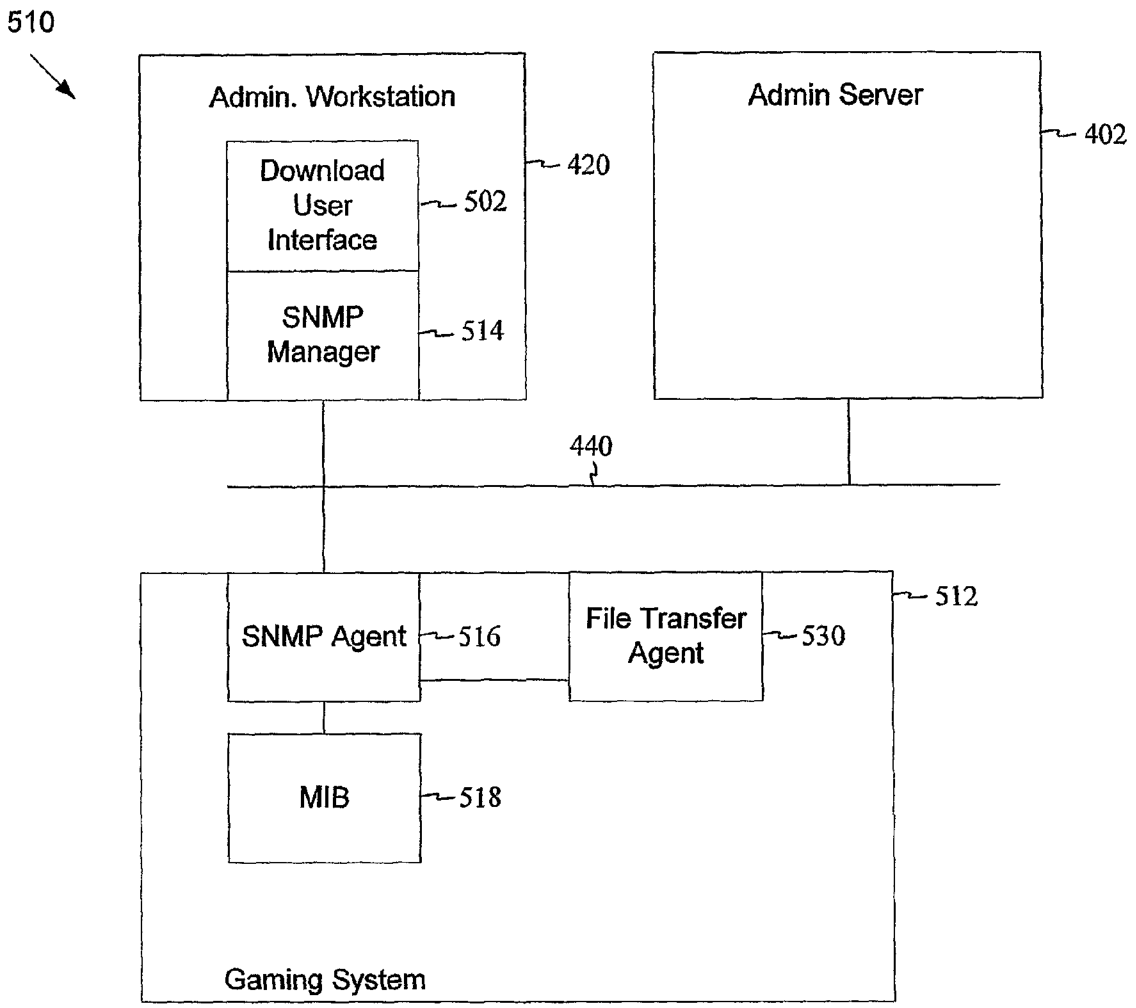

FIG. 5B is a block diagram of a system 510 according to an embodiment of the invention where the download program interface 504 comprises an SNMP (Simple Network Management Protocol) interface. Various versions of SNMP (e.g. SNMP V1-V3) are available; the embodiments of the invention are not limited to any particular version. In some embodiments, system 510 includes an SNMP manager 514, an SNMP agent 516 and a file transfer agent 530.

SNMP manager 514 in some embodiments is executed on administrative workstation 420, and may be interfaced with user interface 502. SNMP manager 514 communicates using the SNMP protocol with an SNMP agent 516 executed on one or more gaming systems 512. Gaming systems 512 may be any server system or gaming machine 100 communicably coupled to a gaming network.

SNMP agent 516 executes on a gaming system and manages predefined data elements in one or more MIBs (Management Information Blocks). In some embodiments, the MIBs contain data related to downloading a game component. Such data may include the name of a downloadable game component, a network location that may be used to retrieve the downloadable game component, authentication data to be used for the download (e.g. user ID and/or password) a protocol (e.g. FTP) to use to retrieve the downloadable game component, status indicators regarding a download (e.g. amount transferred, percent complete, error indicators etc.). In addition, in some embodiments, a MIB may contain data used to control clearing RAM on a gaming machine. In further alternative embodiments, a MIB may contain data regarding a tilt status of a gaming machine 100, and a flag indicating the tilt condition should be cleared.

In response to commands or function calls issued by user interface 502, SNMP manager 514 issues primitives to get and set data in the MIB to control downloading games. These primitives include:

get (retrieve operation)
get next (traversal operation)
get response (indicative operation)
set (alter operation)

A gaming system 512 may issue a trap to notify the administrative workstation 420 via SNMP manager 514 that an event has occurred. For example, the trap may indicate that a download has completed, that a tilt condition has occurred, or that a user has pressed a help or attendant call button.

File transfer agent 530 comprises a program or module that implements a file transfer protocol to perform the actual download. For example, the file transfer agent may implement the FTP (File Transfer Protocol), TFTP (Trivial File Transfer Protocol), RCP (Remote Copy) protocol, or a peer to peer network protocol. The embodiments of the invention are not limited to any particular protocol.

Figure 5C:
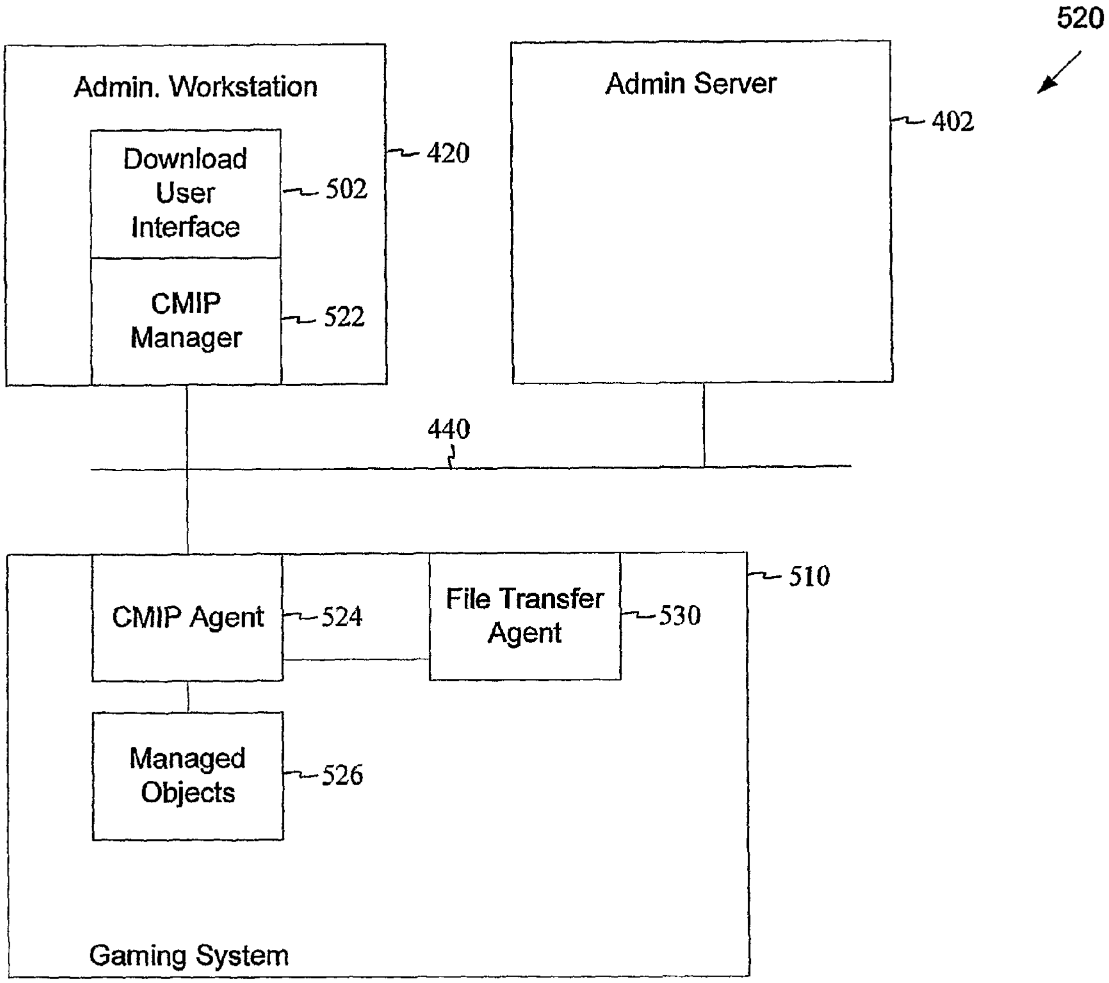

FIG. 5C is a block diagram of a system 520 according to embodiments of the invention where the download program interface 504 comprises a CMIP (Common Management Information Protocol) interface. CMIP is an OSI standard protocol used with the Common Management Information Services (CMIS). CMIP/CMIS are defined in ISO documents 9595 and 9596 and ITU documents X.700 and X.711. CMIS defines a system of network management information services. CMIP was proposed as alternative to SNMP.

System 520 operates in much the same way as SNMP system 510. For example, CMIP manager 522 in some embodiments is executed on administrative workstation 420, and may be interfaced with user interface 502. CMIP manager 514 communicates using the CMIP/CMIS protocol with an CMIP agent 524 executed on one or more gaming systems 512.

CMIP agent 524 executes on a gaming system 512 and manages predefined data elements in one or more managed objects. In some embodiments, the managed objects contain data related to downloading a game component. Such data may include the name of a downloadable game component, a network location that may be used to retrieve the downloadable game component, authentication data to be used for the download (e.g. user ID and/or password) a protocol (e.g. FTP) to use to retrieve the downloadable game component, status indicators regarding a download (e.g. amount transferred, percent complete, error indicators etc.). In addition, in some embodiments, a MIB may contain data used to control clearing RAM on a gaming machine. In further alternative embodiments, a MIB may contain data regarding a tilt status of a gaming machine 100, and a flag indicating the tilt condition should be cleared.

In response to commands or function calls issued by user interface 502, CMIP manager 514 issues primitives to get and set data in the managed objects to control downloading games. Like SNMP, CMIP provides get and set primitives. In addition, CMIP provides primitives that can be used to perform tasks. Additionally, CMIP provides security primitives that support authorization, access control, and security logs.

Access to managed information in the managed objects is provided by the Common Management Information Service Element (CMISE) that uses CMIP (Common Management Information Protocol) to issue requests for management services. The management services provided by CMIP/CMISE can be organized into two distinct groups, management operation services initiated by a manager to request that an agent 524 provide certain services or information, and notification services, used by the management agents to inform the CMIP managers 522 that some event or set of events have occurred.

Figure 6:
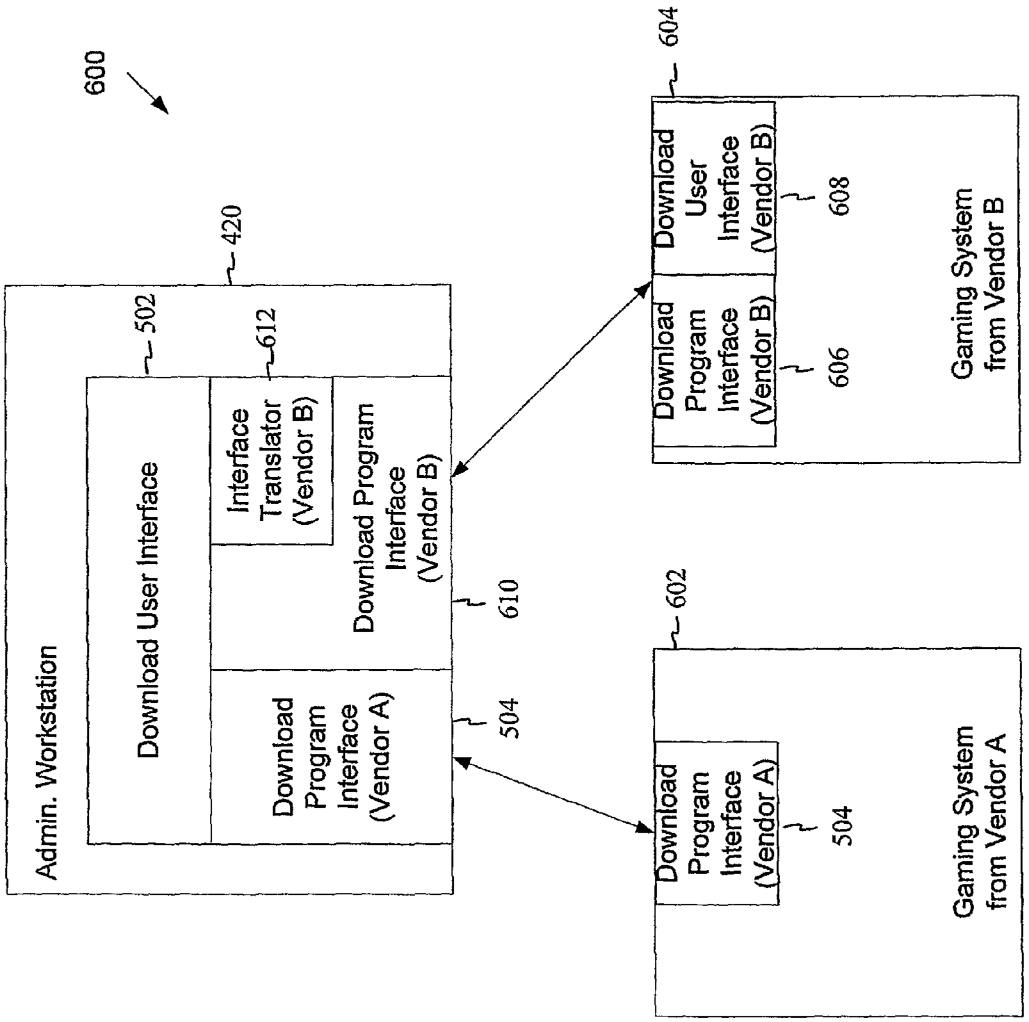
FIG. 6 is a block diagram of components used to manage downloads in a multi-vendor gaming system environment according to an example embodiment.

FIG. 6 is a block diagram of the major components of a system 600 used to manage updates in a multi-vendor gaming system environment according to an example embodiment. In some embodiments, system 600 includes administrative workstation 420, at least one gaming system 602 from a first vendor (vendor A), and at least one gaming system 604 from a second vendor (vendor B). Gaming systems 602 and 604 may be gaming machines such as gaming machines 100, or they may be servers such as administrative servers, progressive servers, sign servers, accounting servers or other servers in a gaming network.

In some embodiments, the vendor B gaming system 604 provides a second download program interface 606 that provides similar functionality to that of the vendor A interface 504, but may use different function calls and/or data elements to perform the functions. Further, in some embodiments, vendor B gaming system 604 may provide a user interface 608 to control downloads.

Administrative workstation 420 provides a download user interface 502 that as described above, uses download program interface 504 to control downloads to gaming system 602. In some embodiments, download user interface 502 is coupled or linked with a second download interface 610 for vendor B systems that communicates with an interface on vendor B gaming system 604. In alternative embodiments, an interface translator 612 may provide functions that translate function calls and data from a common interface, or a default vendor interface (e.g. interface 504) to the vendor B interface.

In some embodiments, the download interface 610 may be communicably coupled with the second download program interface 606. In these embodiments, data is exchanged between the interfaces according to a predetermined protocol. The protocol provides the mechanism by which downloadable game components may be downloaded to a gaming system 604.

In alternative embodiments, the download interface 610 may be designed to emulate a human user of download user interface 604. In these embodiments, function calls from download interface 502 to interface 610 are translated into user interface commands (e.g. icon selections, menu selections, button selections, pointer movements, text input etc.) that are then communicated to the download user interface 604 as if they came from a human user.

As can be seen from the above, system 600 provides a user interface that may be used to control downloads for multiple disparate download interfaces from a single administrative workstation.

Figure 7:
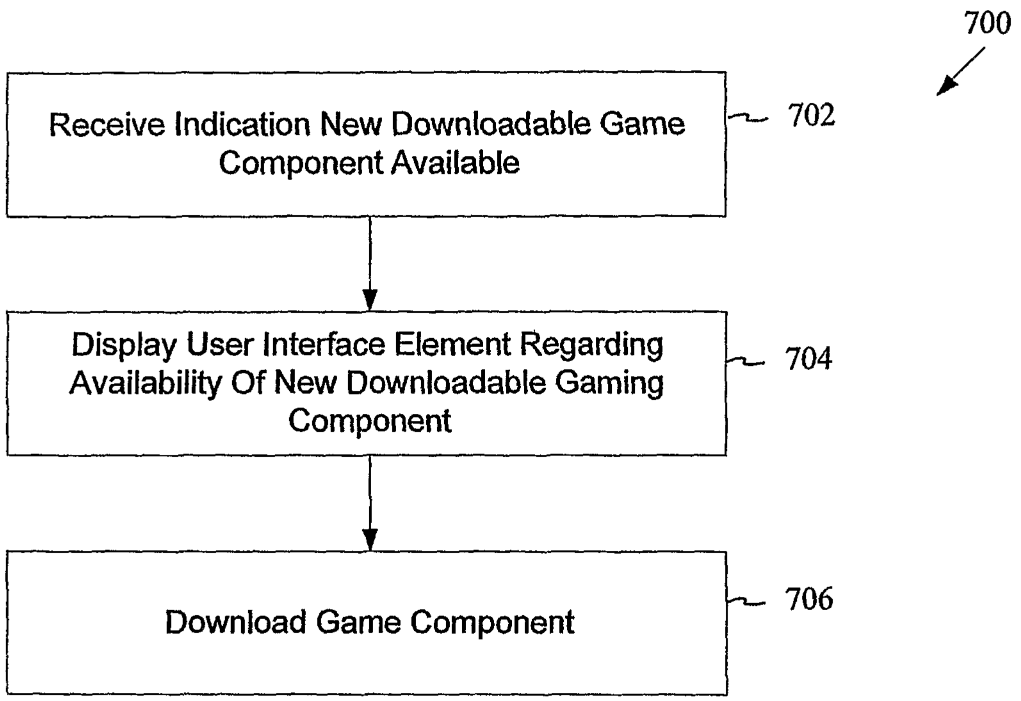
FIG. 7 is a flowchart illustrating a method for managing downloads of game components.

FIG. 7 is a flowchart illustrating a method for managing downloads of game components according to various embodiments of the invention. The methods to be performed by the operating environment constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The method illustrated in FIG. 7 is inclusive of acts that may be taken by an operating environment executing an exemplary embodiment of the invention.

The method beings by receiving an indication that a new downloadable game component is available (block 702). In some embodiments, he indication may be received in response to a query by a system executing the method to a system managing downloadable game components. In alternative embodiments, the indication may be received asynchronously by the system, for example as a message sent over a network from a game component management system to an administrative workstation or gaming machine 100. In some embodiments, the new downloadable game component may comprise an update to a previously existing game component.

In some embodiments, the system may display a user interface element indicating that a new downloadable game component is available (block 704). The user interface element may be an icon, a menu element, a labeled button, or any other user interface element know in the art.

Finally, the system downloads the downloadable gaming component (block 706). The download may be user initiated from an administrative workstation or gaming machine, or the download may proceed automatically.

CONCLUSION

Systems and methods for managing downloads in a network of gaming machines have been described. Although specific embodiments have been illustrated and described herein, it will be appreciated by those of ordinary skill in the art that any arrangement which is calculated to achieve the same purpose may be substituted for the specific embodiments shown. For example, the configuration and download methods described above were provided in the context of updating one or more gaming machines. The systems and method may also be used to update configuration elements on other devices on a gaming network. For example, auxiliary servers such as progressive servers, overhead sign controllers and other devices may be administered in the same manner as described above. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A gaming administration system comprising:

a random element generator configured to generate one or more random elements;

a first set of gaming machines communicably coupled to a network, the first set of gaming machines communicably coupled to a second set of gaming machines via the network, wherein each set of gaming machines includes at least one gaming machine having one or more processors coupled to a display to present a wagering gaming application on which monetary value may be wagered and whose outcome is based on the random elements generated by the random element generator, a cabinet constructed to house components of the gaming machine, an electronic display device, a user interface device, and a network interface to communicably couple the gaming machine to the network, wherein the electronic display device and the user interface device are coupled to the cabinet, the user interface device being configured to receive a physical input from a player to initiate the wagering gaming application and transform the input into an electronic data signal, and wherein each gaming machine provides a gaming machine download program interface; and an administrative workstation communicably coupled to the network, the administrative workstation including a download user interface to display user interface elements, a first download program interface coupled to the download user interface, a second download program interface, and an interface translator coupled to the second download program interface and the download user interface;

wherein the first download program interface and the second download program interface provide one or more commands for use with the first set of gaming machines and the second set of gaming machines respectively, the commands provided to a gaming machine download program interface of one or more particular gaming machines to enable downloading of a downloadable game component to the particular gaming machines, wherein the first download program interface accepts a different set of commands than the second download program interface; and wherein the interface translator provides translation of commands provided in the download user interface for use with the second download program interface, by translating one or more function calls and data of a format used with the first program interface into one or more function calls and data of a format used with the second download program interface.

2. The gaming administration system of claim 1, further comprising a file transfer agent operable to download a downloadable game component.

3. The gaming administration system of claim 2, wherein the file transfer agent comprises an FTP (File Transfer Protocol) agent.

4. The gaming administration system of claim 2, wherein the file transfer agent comprises a TFTP (Trivial File Transfer Protocol) agent.

5. The gaming administration system of claim 1, wherein the first download program interface comprises an SNMP manager module, and wherein the gaming machine download program interface for the first set of gaming machines comprises an SNMP agent module.

6. The gaming administration system of claim 1, wherein the first download program interface comprises a CMIP manager module, and wherein the gaming machine download program interface for the first set of gaming machines comprises a CMIP agent module.

7. The gaming administration system of claim 1, further comprising one or more update management modules operable to determine if a new downloadable software component is available.

8. The gaming administration system of claim 7, further comprising one or more update management modules further operable to cause a user interface element to he displayed in the download user interface upon determining the new downloadable software component is available.

9. The gaming administration system of claim 1, wherein the second download program interface includes a second download user interface.

10. The gaming administration system of claim 1, wherein the downloadable game component includes an element selected from the group consisting of banner content, advertising content, denomination, pay table, language data, video content, audio content, episodic game data, wagering game software, operating system software, device driver software, and device firmware.

11. A method comprising:

receiving an indication that a new downloadable game component is available for a gaming system of a plurality of gaming systems, the gaming system in one of a first subset of the plurality of gaming systems or a second subset of the plurality of gaming systems, wherein the first subset of gaming systems provides a first download program interface and the second subset of gaming systems provides a second download program interface different from the first download interface, the first download program interface and the second download program interface configured to process commands including download commands used to initiate downloading of the new downloadable game component, wherein the first download program interface accepts a different set of commands than the second download program interface, and further wherein the gaming systems include at least one gaming machine having one or more processors coupled to a display to present a wagering gaming application on which monetary value may be wagered, the gaming machine including a cabinet constructed to house components of the gaming machine, an electronic display device, a user interface device, wherein the electronic display device and the user interface device are coupled to the cabinet, the user interface device being configured to receive a physical input from a player to initiate the wagering gaming application and transform the input into an electronic data signal;

responsive to determining the gaming system is in the second subset of gaming systems, translating the download commands including one or more function calls and data from a format used with the first download program interface into a format used with the second download program interface; and downloading the new downloadable game component to the gaming system.

12. The method of claim 11, wherein receiving the indication includes:

issuing a request to a gaming system in the plurality of gaming systems to determine if the new downloadable game component is available; and receiving a response to the request, the response providing the indication that the new downloadable game component is available.

13. The method of claim 11, wherein receiving the indication includes receiving asynchronously the indication that the new downloadable game component is available.

14. The method of claim 11, further comprising displaying a user interface element indicating that the new downloadable game component is available.

15. The method of claim 11, wherein the second download interface is a user interface.

16. The method of claim 11, wherein the ne\v downloadable game component comprises an update to a previously existing downloadable game component.

17. A computer-readable, non-transitory medium having computer executable instructions for causing one or more processors to perform a method, the method comprising:

receiving an indication that a new downloadable game component is available for a gaming system of a plurality of gaming systems, the gaming system in one of a first subset of the plurality of gaming systems or a second subset of the plurality of gaming systems, wherein the first subset of gaming systems provides a first download program interface and the second subset of gaming systems provides a second download program interface different from the first download interface, the first download program interface and the second download program interface configured to process commands including download commands used to initiate downloading of the new downloadable game component, wherein the first download program interface accepts a different set of commands than the second download program interface, and further wherein the gaming systems include at least one gaming machine having one or more processors coupled to a display to present a wagering gaming application on which monetary value may be wagered, the gaming machine including a cabinet constructed to house components of the gaming machine, an electronic display device, a user interface device, wherein the electronic display device and the user interface device are coupled to the cabinet, the user interface device being configured to receive a physical input from a player to initiate the wagering gaming application and transform the input into an electronic data signal;

upon determining that the gaming system is in the second subset of gaming systems, translating the download commands including one or more function calls and data from a format used with the first download program interface into a format used with the second download program interface; and downloading the new downloadable game component to the gaming system.

18. The computer-readable, non-transitory medium of claim 17, wherein receiving the indication includes:

issuing a request to the gaming system to determine if the new downloadable game component is available; and receiving a response to the request, the response providing the indication that the new downloadable game component is available.

19. The computer-readable, non-transitory medium of claim 17, wherein receiving the indication includes receiving asynchronously the indication that the new downloadable game component is available.

20. The computer-readable, non-transitory medium of claim 17, wherein the method further comprises displaying a user interface element indicating that the new downloadable game component is available.

21. The computer-readable, non-transitory medium of claim 17, wherein the second download interface is a user interface.

22. The computer-readable, non-transitory medium of claim 17, wherein the new game component comprises an update to a previously existing downloadable game component.

* * * * *